(12) United States Patent
Kutaragi

(10) Patent No.: US 8,890,895 B2
(45) Date of Patent: Nov. 18, 2014

(54) USER INTERFACE DEVICE, USER INTERFACE METHOD AND INFORMATION STORAGE MEDIUM

(75) Inventor: Ken Kutaragi, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1456 days.

(21) Appl. No.: 11/744,947

(22) Filed: May 7, 2007

(65) Prior Publication Data

US 2007/0257915 A1 Nov. 8, 2007

(30) Foreign Application Priority Data

May 8, 2006 (JP) .................................. 2006-129704

(51) Int. Cl.
G09G 5/00 (2006.01)

(52) U.S. Cl.
USPC ............................ 345/633; 715/856; 715/861

(58) Field of Classification Search
USPC .................. 345/633; 715/856–861, 850, 862
See application file for complete search history.

(56) References Cited

U.S. PATENT DOCUMENTS

| | | | | |
|---|---|---|---|---|
| 5,608,850 A | * | 3/1997 | Robertson | 345/427 |
| 5,689,628 A | * | 11/1997 | Robertson | 345/427 |
| 5,736,982 A | * | 4/1998 | Suzuki et al. | 715/706 |
| 5,739,821 A | * | 4/1998 | Ho et al. | 715/807 |
| 6,002,403 A | * | 12/1999 | Sugiyama et al. | 715/717 |
| 6,018,333 A | * | 1/2000 | Denber | 715/790 |
| 6,023,275 A | * | 2/2000 | Horvitz et al. | 715/700 |
| 6,043,818 A | * | 3/2000 | Nakano et al. | 715/851 |
| 6,081,271 A | * | 6/2000 | Bardon et al. | 345/419 |
| 6,088,032 A | * | 7/2000 | Mackinlay | 715/848 |
| 6,121,969 A | * | 9/2000 | Jain et al. | 715/850 |
| 6,211,876 B1 | * | 4/2001 | Ackermann et al. | 715/835 |
| 6,346,956 B2 | * | 2/2002 | Matsuda | 715/848 |
| 6,362,817 B1 | * | 3/2002 | Powers et al. | 345/419 |
| 6,650,343 B1 | * | 11/2003 | Fujita et al. | 715/760 |
| 6,717,600 B2 | * | 4/2004 | Dutta et al. | 715/862 |
| 6,760,030 B2 | * | 7/2004 | Hiroike et al. | 345/473 |
| 6,844,887 B2 | * | 1/2005 | Laffey et al. | 715/861 |
| 6,886,138 B2 | * | 4/2005 | Laffey et al. | 715/860 |
| 6,948,124 B2 | * | 9/2005 | Combs et al. | 715/712 |
| 7,137,075 B2 | * | 11/2006 | Hoshino et al. | 715/848 |
| 7,362,922 B2 | * | 4/2008 | Nishiyama et al. | 382/305 |
| 7,382,374 B2 | * | 6/2008 | Majer et al. | 345/473 |

(Continued)

OTHER PUBLICATIONS

Mine, Virtual Environment Interaction Techniques, University of North Carolina Computer Science Technical Report, p. 1-18, May 5, 1995.*

*Primary Examiner* — M Good Johnson
(74) *Attorney, Agent, or Firm* — Katten Muchin Rosenman LLP

(57) ABSTRACT

To allow a user to issue an adequate instruction concerning a process in connection with a plurality of discrete objects placed in a virtual space. A user interface device comprises a virtual space image display section for producing an image of a virtual space where a plurality of objects are placed, on a real time basis according to a position of a viewpoint defined in the virtual space, and sequentially displaying the image; a viewpoint position change section for changing the position of the viewpoint defined in the virtual space according to a first operation by the user; and an object selection section for selecting one or more objects among the objects placed in the image displayed by the virtual space image display section, according to a second operation by the user.

15 Claims, 12 Drawing Sheets

(56) References Cited

U.S. PATENT DOCUMENTS

| | | | |
|---|---|---|---|
| 7,492,362 B2* | 2/2009 | Sakagawa et al. | 345/419 |
| 7,607,109 B2* | 10/2009 | Ohno et al. | 715/838 |
| 7,620,910 B2* | 11/2009 | Ohno et al. | 715/790 |
| 7,685,534 B2* | 3/2010 | Kamen et al. | 715/848 |
| 7,735,018 B2* | 6/2010 | Bakhash | 715/782 |
| 7,757,252 B1* | 7/2010 | Agasse | 725/41 |
| 2001/0009418 A1* | 7/2001 | Hiroike et al. | 345/427 |
| 2002/0067376 A1* | 6/2002 | Martin et al. | 345/810 |
| 2003/0007016 A1* | 1/2003 | Laffey et al. | 345/861 |
| 2003/0071856 A1* | 4/2003 | Nagahara et al. | 345/850 |
| 2004/0100484 A1* | 5/2004 | Barrett | 345/719 |
| 2004/0141014 A1* | 7/2004 | Kamiwada et al. | 345/848 |
| 2004/0247174 A1* | 12/2004 | Lyons et al. | 382/154 |
| 2005/0097506 A1* | 5/2005 | Heumesser | 717/102 |
| 2005/0144574 A1* | 6/2005 | Chang | 715/850 |
| 2006/0125845 A1* | 6/2006 | Takeuchi et al. | 345/619 |
| 2006/0150215 A1* | 7/2006 | Wroblewski | 725/47 |
| 2007/0035563 A1* | 2/2007 | Biocca et al. | 345/633 |
| 2007/0070066 A1* | 3/2007 | Bakhash | 345/419 |
| 2007/0252833 A1* | 11/2007 | Kuroki | 345/427 |
| 2008/0214304 A1* | 9/2008 | Castle | 463/36 |

* cited by examiner

USER INTERFACE DEVICE, USER INTERFACE METHOD AND INFORMATION STORAGE MEDIUM

BACKGROUND OF THE INVENTION

The present invention relates to a user interface device, a user interface method, and an information storage medium.

Three-dimensional computer graphics are known in which the image of a picture resulting from viewing a virtual space, where various objects and a viewpoint are defined, from that viewpoint, is displayed on a monitor. According to this technique, the positions of the viewpoint and the objects can be moved on a real time basis, and the image of a picture resulting from viewing the virtual space from the viewpoint is updated on a real time basis. This makes it possible to impart a sense of virtual reality to the user.

According to conventional three-dimensional computer graphics, however, as the picture resulting from viewing the virtual space from the viewpoint is displayed on the monitor, two or more objects placed apart from each other in the virtual space cannot be simultaneously displayed on the monitor. This leads to a problem that the user cannot readily and adequately issue an instruction concerning a process involving such discrete objects.

SUMMARY OF THE INVENTION

The present invention has been conceived in view of the above, and an object thereof is to provide a user interface device, a user interface method, and an information storage medium for allowing the user to issue an adequate instruction concerning a process involving a plurality of objects placed apart from each other in a virtual space.

In order to solve the above described problems, according to one aspect of the present invention, there is provided a user interface device, comprising virtual space image display means for producing an image of a virtual space where a plurality of objects are placed, on a real time basis according to a position of a viewpoint defined in the virtual space, and sequentially displaying the image; viewpoint position change means for changing the position of the viewpoint defined in the virtual space according to a first operation by the user; object selection means for selecting one or more objects among the objects placed in the image displayed by the virtual space image display means, according to a second operation by the user; and process execution means for executing a predetermined process in connection with the selected objects.

In the above, the object selection means may specify a position or an area in the image displayed by the virtual space image display means and select one or more of the objects displayed in the specified position or area, according to the second operation by the user.

In the above, the object selection means may select one or more of the objects displayed in the specified position or area, according to a distance between a position of each of the objects displayed in the specified position or area and the position of the viewpoint.

In the above, the object selection means may select one or more of the objects displayed in the specified position or area, according to an attribute of each of the objects displayed in the specified position or area.

In the above, the object selection means may select one or more of the objects displayed in the specified position or area, according to an area occupied in the image, of each of the objects displayed in the specified position or area.

In the above, the viewpoint position change means may change the position of the viewpoint defined in the virtual space, according to a posture of the operation device, which is changed according to the first operation by the user.

In the above, the process execution means may carry out a process to collectively display images concerning the selected objects.

According to another aspect of the present invention, there is provided a user interface method, comprising a virtual space image display step of producing an image of a virtual space where a plurality of objects are placed, on a real time basis according to a position of a viewpoint defined in the virtual space, and sequentially displaying the image; a viewpoint position change step of changing the position of the viewpoint defined in the virtual space according to a first operation by the user; an object selection step of selecting one or more objects among the objects placed in the image displayed at the virtual space image display step, according to a second operation by the user; and a process execution step of executing a predetermined process in connection with the selected objects.

According to still another aspect of the present invention, there is provided an information storage medium storing a program for causing a computer to function as virtual space image display means for producing an image of a virtual space where a plurality of objects are placed, on a real time basis according to a position of a viewpoint defined in the virtual space, and sequentially displaying the image; viewpoint position change means for changing the position of the viewpoint defined in the virtual space according to a first operation by the user; object selection means for selecting one or more objects among the objects placed in the image displayed by the virtual space image display means, according to a second operation by the user; and process execution means for executing a predetermined process in connection with the selected objects.

DESCRIPTION OF THE EMBODIMENTS

In the following, one embodiment of the present invention will be described in detail with reference to the accompanying drawings.

Figure 1:
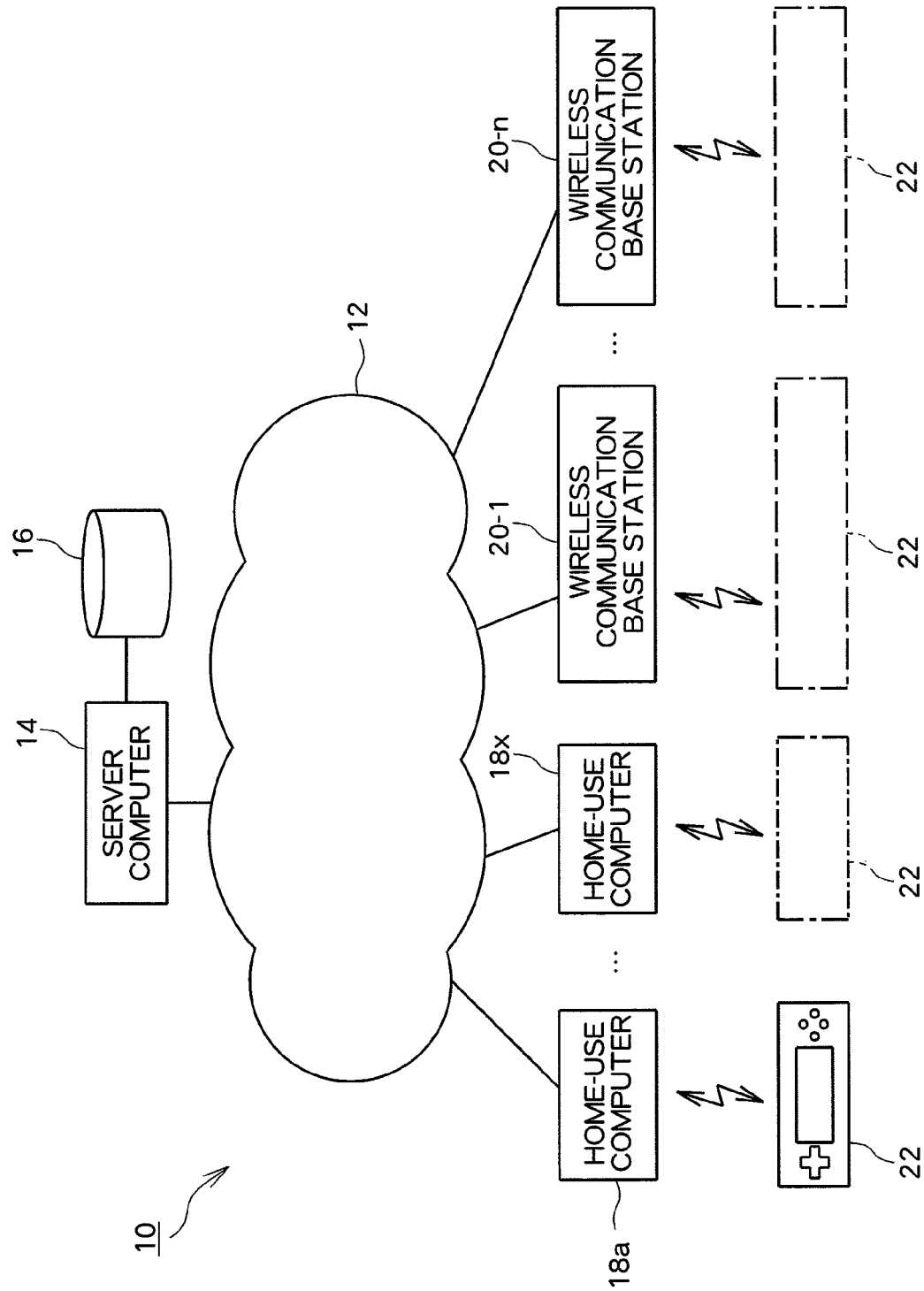
FIG. 1 is a diagram showing an overall structure of an information processing system according to an embodiment of the present invention.

FIG. 1 is a diagram showing an overall structure of an information processing system according to one embodiment of the present invention. As shown in FIG. 1, the information processing system 10 is constructed comprising a plurality of home-use computers 18a through 18x, a plurality of wireless communication base stations 20-1 through 20-n, and a server computer 14, all connected to a communication network 12 such as the Internet, or the like.

Each of the home-use computers 18a through 18x is a computer installed in a user's home, and connected to home electrical appliances such as a home-use television set receiver, and so forth, functioning as a home server. Each of the home-use computers 18a through 18x obtains a game program by reading from a computer readable information storage medium, such as a CD-ROM, a DVD-ROM, and so forth, or downloading from the server computer 14, and executes the obtained program to provide the user with a game. It should be noted that in the following description, matters common to all home-use computers 18a through 18x are described while simply referring to a home-use computer 18.

Figure 2:
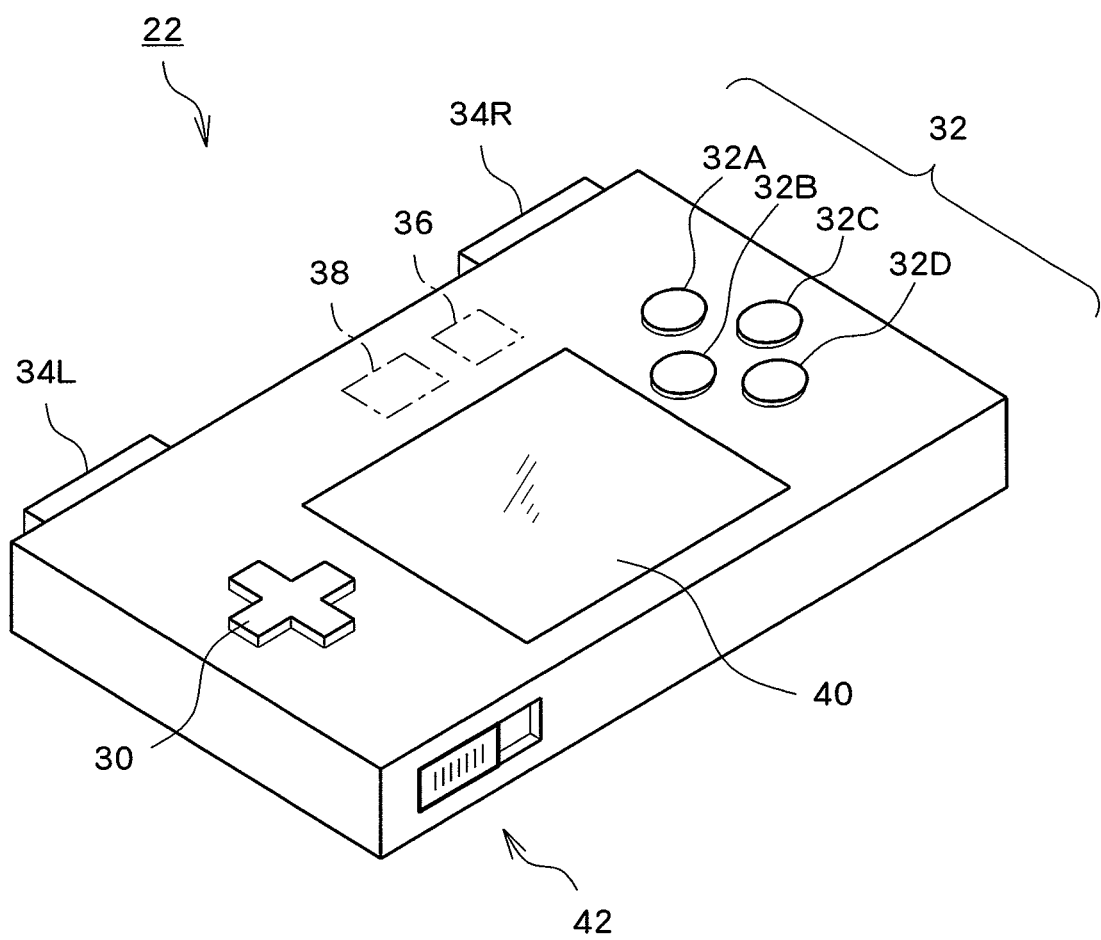
FIG. 2 is a perspective view showing an external appearance of an operation device.

The home-use computer 18 utilizes an operation device 22 as an operation input means. The operation device 22 is a portable computer having a rectangular thin-box shape with an external appearance such as is shown in FIG. 2 and a liquid crystal display panel 40 mounted in the middle of the front surface thereof. A direction key 30 is provided on the left side of the display panel 40, and a button group 32 including buttons 32A through 32D is provided on the right side thereof. Auxiliary buttons 34L, 34R are provided on one lateral side of the operation device 22, with a power button 42 for switching the operation modes of the operation device 22 between a standby mode (a power saving operation mode) and a normal operation mode being provided on the other lateral side thereof.

Figure 3:
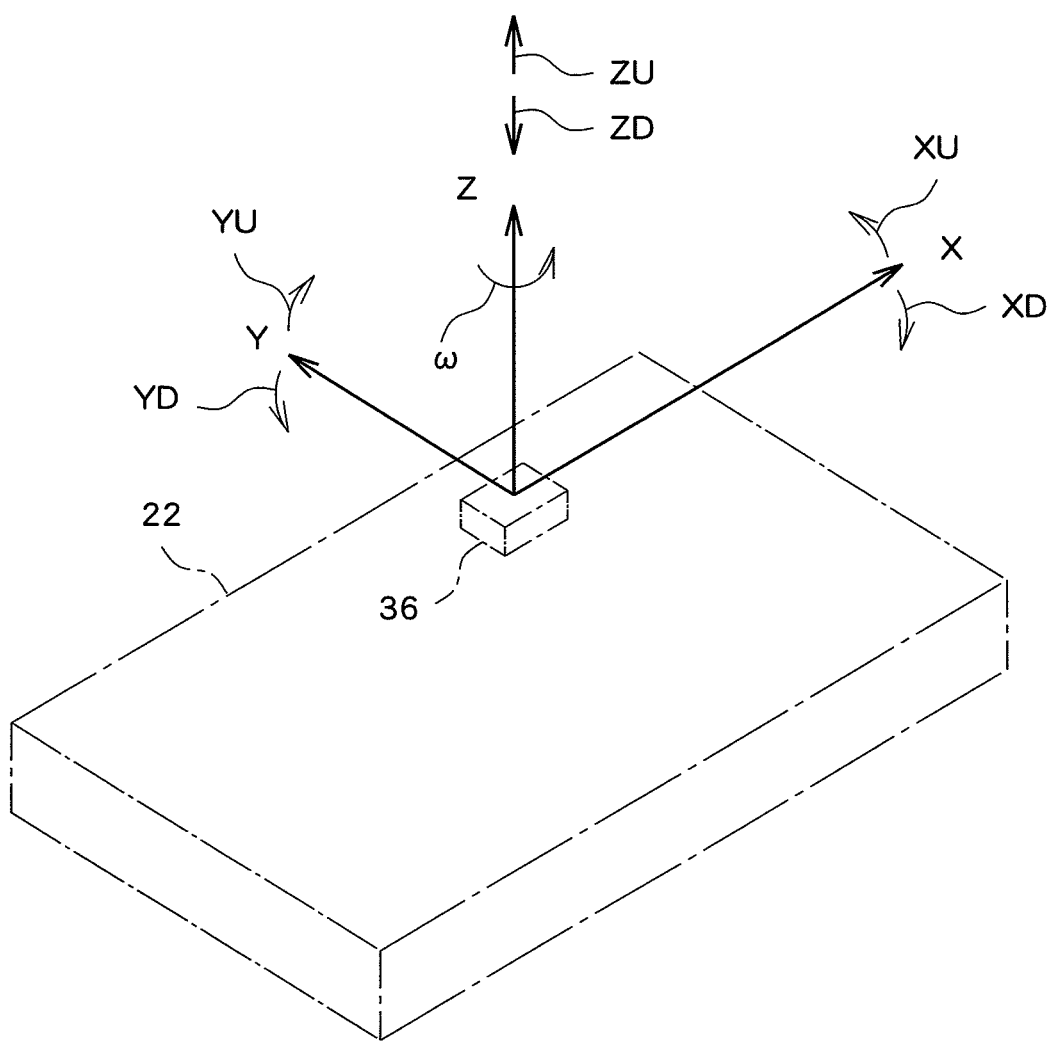
FIG. 3 is a diagram explaining data detected by the operation device.

The operation device 22 has a gyroscope 38 built-in the middle portion thereof in the longitudinal direction and an acceleration sensor 36 built-in on the side of the gyroscope 38. The acceleration sensor 36 is a triaxial acceleration sensor for detecting accelerations in three mutually orthogonal directions. Specifically, as shown in FIG. 3, the acceleration sensor 36 detects acceleration in the X-direction, or the right-left direction (a longitudinal direction) of the operation device 22, caused by gravity and movement of the operation device 22, acceleration in the Y-direction, or the depth direction (a shorter-side direction) of the operation device 22, caused by gravity and movement of the operation device 22, and acceleration in the Z-direction, or the width direction of the operation device 22, caused by gravity and movement of the operation device 22.

Based on the accelerations in the three directions, the operation device 22 and the home-use computer 18 can determine the posture of the operation device 22. Specifically, the amounts of rotations of the operation device 22 relative to the Y-axis (codes XU and XD) and the X-axis (codes YU and YD), respectively, can be determined. Also, acceleration caused by the operation device 22 moving vertically can be determined (codes ZU and ZD). With this arrangement, the operation device 22 and the home-use computer 18 can know that the operation device 22 is lifted, or placed, in the vertical direction. Further, an angular velocity ω of the rotation around the Z-direction, or the width direction of the operation device 22, can be also determined using the gyroscope 38, which is built-in in the operation device 22, as described above.

The home-use computer 18 and the operation device 22 each have a wireless communication means, such as Blue-Tooth (trademark), a wireless LAN, and so forth. This allows the operation device 22 to transmit by air the data obtained by the acceleration sensor 36 and/or the gyroscope 38 and the states of input of, and the results of processing by, the button group 32, the auxiliary button 34, and the direction key 30, to the home-use computer 18. Having received the data from the operation device 22, the home-use computer 18 carries out various information processes according to the data.

The result of information processing is displayed by a TV receiver, or output as sound via the built-in speaker thereof. The result may be additionally sent to the operation device 22, as necessary, to be displayed on the display panel 40, or output as sound via the built-in speaker thereof.

Here, the operation device 22 is capable of wireless communication with any home-use computer 18. Therefore, the user having brought their operation device 22 with them to another user's home can establish communication between their operation device 22 and the home-use computer 18 in that place. Also, the user can establish communication between their operation device 22 and the home-use computer 18 in their home via the home-use computer 18 in the other user's home and the communication network 12.

Each of the wireless communication base stations 20-1 through 20-n has a wireless communication means such as BlueTooth (trademark), a wireless LAN, and so forth. Each of the wireless communication base stations 20-1 through 20-n carries out data communication by air with an operation device 22 to relay communication by the operation device 22 with the server computer 14 and/or the home-use computer 18 in the user's home via the communication network 12.

As the wireless communication base stations 20-1 through 20-n are installed in public facilities such as a station, or the like, the user having brought their operation device 22 with them to outside their home can access the home-use computer 18 in their home and the server computer 14 via any of these wireless communication base stations 20-1 through 20-n and the communication network 12.

The server computer 14 is a known computer to which a database 16 is connected. The database 16 stores e-mails addressing the user and games and other data to be distributed to the user in the manner of being associated with the identification information of the user of each home-use computer 18. The server computer 14, in response to the identification information sent from the user of each home-use computer 18 using their operating device 22, returns the e-mails and other data stored in the database 16 associated with the identification information. It should be noted that the server computer 14 may distribute various other data to the home-use computer 18 and the operation device 22.

The above-described structure allows the user to send operational signals to the home-use computer 18 in their home, using their operation device 22, to thereby control the operation thereof. In addition, operating the operation device 22, the user can control the home electrical appliance, such as a TV receiver, and so forth, which is connected to the home-use computer 18, so as to operate as desired. For example, using the operation device 22, the user can control the home-use computer 18 so as to execute a game program, and to display the content of the execution in the TV receiver. Also, the user using the operation device 22 can operate the game.

Further, the user using the operation device 22 can arrange to display images, including ones captured using a digital still camera and/or another stored in the home-use computer 18 or any memory device (not shown) connected thereto, in a TV receiver, and select some of the displayed images to be processed as predetermined, such as printing, and so forth, for example. Still further, as the home-use computer 18 is connected to the communication network 12, the user using the operation device 22 can receive e-mails or other data from the server computer 14, and display in the TV receiver or on the display panel 40.

When the user is outside their home carrying their operation device 22 with them, the user can connect the operation device 22 to the home-use computer 18 in their friend's home for communication. In this case, two operation devices 22, that is, the user's and the user's friend's, are connected to the home-use computer 18 in the friend's home. This allows the user and the friend to operate an application program usable by two or more people, such as a match game or the like, using their operation devices 22. In addition, the user can establish data communication via the communication network 12 between their operation device 22 and the home-use computer 18 in their home and/or the server computer 14, using the home-use computer 18 in the friend's home as a relay device.

Likewise, when the user is outside their home carrying their operation device 22 with them, the user can connect the operation device 22 to any of the wireless communication base stations 20-1 through 20-n in public facilities, such as a station or the like. Also in this case, it is possible to establish data communication between the user's operation device 22 and the home-use computer 18 in the user's home and/or the server computer 14 via the communication network 12.

In this embodiment, the operation device 22 has the acceleration sensor 36 and the gyroscope 38, and movement or change in posture of the operation device 22 affects outputs of the acceleration sensor 36 and the gyroscope 38. Outputs of the acceleration sensor 36 and the gyroscope 38 can be wirelessly transmitted as operational signals to the home-use computer 18 and the server computer 14. That is, the user can instruct the home-use computer 18 and the server computer 14 to operate as desired, by moving or changing the posture of the operation device 22.

In this embodiment, the outputs of the acceleration sensor 36 and the gyroscope 38 are referred to in determination of the states of the operation device 22 and the user thereof. Specifically, outputs of the acceleration sensor 36 and the gyroscope 38 are stored in the operation device 22 every predetermined period of time, so that the states of the operation device 22 and the user thereof are determined based on the content stored in the operation device 22 and output pattern information prepared in advance concerning the outputs of the acceleration sensor 36 and the gyroscope 38. For example, suppose that a pattern is found, in which outputs of the acceleration sensor 36 and the gyroscope 38 remain unchanged for a predetermined period of time, followed by detection of acceleration in the Z-direction by the acceleration sensor 36. In this case, it is determined that the user takes up (picks up) the operation device 22.

It should be noted that, when outputs of the acceleration sensor 36 and the gyroscope 38 remain unchanged for a predetermined period of time, the operation device 22 switches the operation mode thereof to a standby mode (a power saving operation mode) with smaller power consumption, while continuing determination of the states of the operation device 22 and the user thereof based on the outputs of the acceleration sensor 36 and the gyroscope 38. When it is determined that the user picks up the operation device 22, as described above, the operation device 22 then operating in the standby mode shifts the current operation mode to the normal operation mode. Further, the operation device 22 sends an operation instruction to the home-use computer 18 in the user's home, instructing to stop operating in the standby mode (the power saving operation mode) and to begin operating in the normal operation mode. This arrangement allows the user to control the home-use computer 18 so as to begin operating in the normal operation mode, without applying a specific operation such as pressing the power button of the operation device 22, or the like.

When the acceleration sensor 36 detects negative acceleration in the Z-direction, followed by outputs of the acceleration sensor 36 and the gyroscope 38 remaining unchanged for a predetermined period of time, the operation device 22 determines that the user places the operation device 22 on a table. In this case, the operation device 22 sends an operation instruction to the home-use computer 18 in the user's home, instructing to stop operating in the normal operation mode and to begin operating in the standby mode.

When it is determined, based on an output from the acceleration sensor 36, that the operation device 22 moves up and down in a constant direction, it is determined that the user is walking or running while carrying the operation device 22 with them. Suppose that it is determined that the user is outside their home, that is, the home-use computer 18 is out of the communicable area with the home-use computer 18, and that the user is walking or running while carrying the operation device 22 with them, as described above. In this case, the operation device 22 sends a message telling that the user is walking or running to the home-use computer 18 in the user's home. Thereupon, the home-use computer 18 in the user's home returns data for showing a service menu screen appropriate for the user's current situation on the display panel 40.

When acceleration in a constant direction continues over a predetermined period of time, it is determined that the user is utilizing a movement means such as a vehicle, a train, and so forth. Suppose that it is determined that the user is outside their home, that is, the home-use computer 18 is out of the communicable area with the home-use computer 18, and that the user is utilizing a movement means such as a vehicle, a train, or the like, while carrying their operation device 22, as described above. In this case, the operation device 22 sends a message telling that the user is utilizing a movement means to the home-use computer 18 in the user's home. Thereupon, the home-use computer 18 in the user's home returns data for showing a service menu screen appropriate for the user's current situation on the display panel 40.

Figure 4:
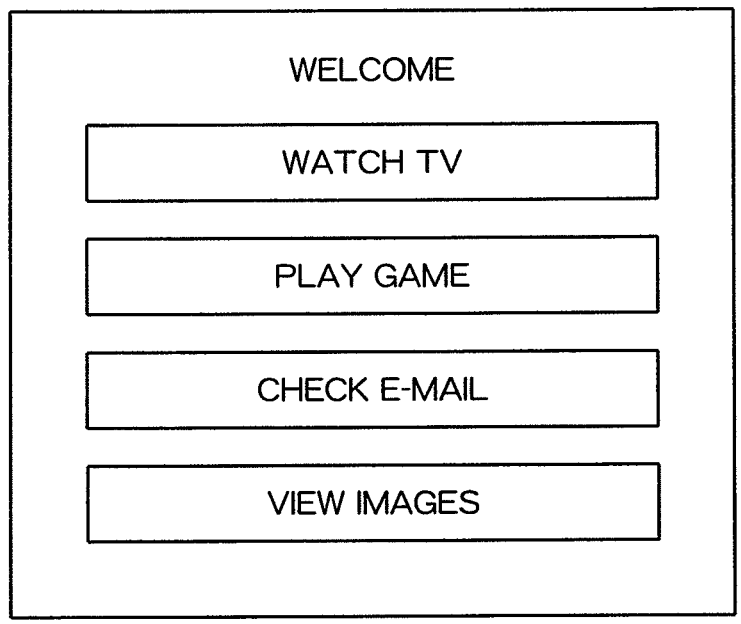
FIG. 4 is a diagram showing the image of a service menu screen which a home-use computer in the user's home provides to the operation device carried by the user when the user is in their home.

In this embodiment, when direct wireless communication can be established between the operation device 22 and the home-use computer 18 in the user's home via no intervening communication network 12, the home-use computer 18 produces the data of a service menu screen, as shown in FIG. 4, which contains four menus items, namely, "watch TV" for displaying content of TV broadcasting in a TV receiver connected to the home-use computer 18; "play game" for causing the home-use computer 18 to execute a game program; "check e-mail" for accessing the server computer 14 from the home-use computer 18 to receive e-mails addressing the user and to display in the TV receiver or the display panel 40; and "view images" for displaying images stored in the home-use computer 18 or the memory device (not shown) connected thereto in the TV receiver. Then, the produced data is sent to the operation device 22, and the screen image is displayed on the display panel 40 thereof.

Figure 5:
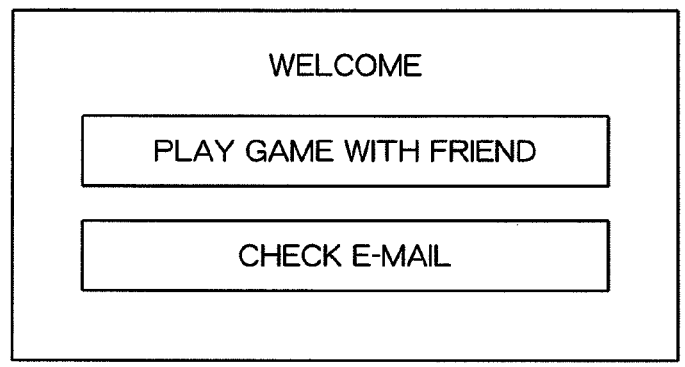
FIG. 5 is a diagram showing the image of a service menu screen which the home-use computer in the friend's home provides to the operation device carried by the user when the user is in their friend's home.

When direct wireless communication can be established between the operation device 22 and the home-use computer 18 in the user's friend's home via no intervening communication network 12, the home-use computer 18 in the user's home produces the data of a service menu screen, as shown in FIG. 5, which contains two menu items, namely "play game with friend" for causing the home-use computer 18 in the friend's home to execute a game program and to play a game with a friend, and "check e-mail" for receiving e-mails addressing the user from the server computer 14 via the home-use computer 18 in the friend's home serving as a relay device and to display on the display panel 40. Then, the produced data is sent to the operation device 22, and the screen image is displayed on the display panel 40 thereof.

Figure 6:
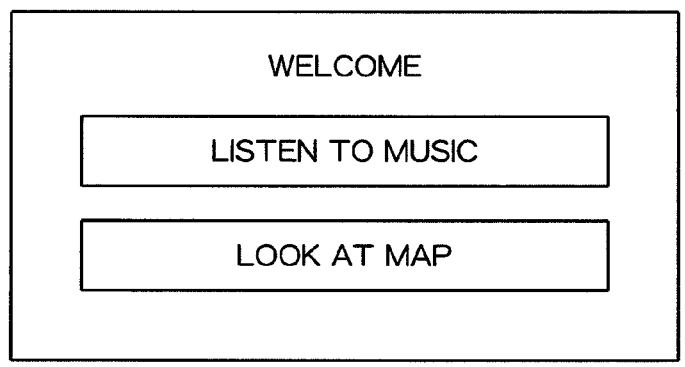
FIG. 6 is a diagram showing the image of a service menu screen which the home-use computer in the user's home provides via a communication network to the operation device carried by the user when the user is walking outside their home.

When direct wireless communication cannot be established between the operation device 22 and any home-use computer 18, but can be established between the operation device 22 and any of the wireless communication base stations 20-1 through 20-n, and further when it is determined that the user is walking or running while carrying the operation device 22 with them, as described above, the home-use computer 18 in the user's home produces the data of a service menu screen, as shown in FIG. 6, which contains two items, namely "listen to music" for downloading music data from the home-use computer 18a in the user's home to reproduce and output, and "look at map" for downloading map data from the home-use computer 18a in the user's home to display on the display panel 40. Then, the produced data is sent to the operation device 22, and the screen image is displayed on the display panel 40 thereof.

Figure 7:
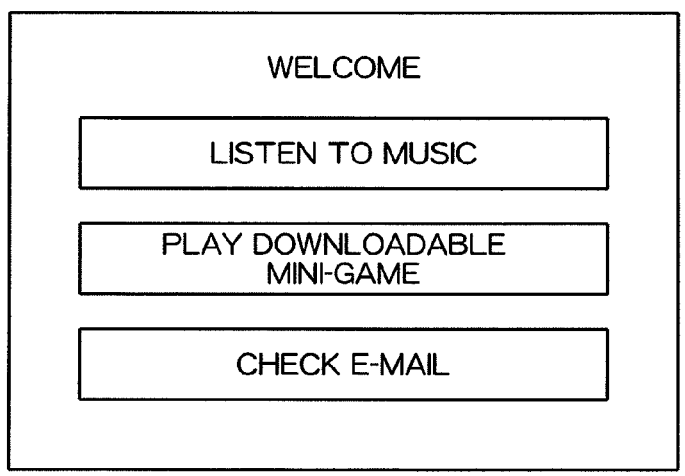
FIG. 7 is a diagram showing the image of a service menu screen which the home-use computer in the user's home provides via a communication network to the operation device carried by the user when the user is not walking outside their home.

In cases similar to the above, that is, when direct wireless communication cannot be established between the operation device 22 and any home-use computer 18, but can be established between the operation device and any of the wireless communication base stations 20-1 through 20-n, and further when it is determined that the user is utilizing a movement means, the home-use computer 18 in the user's home produces the data of a service menu screen, as shown in FIG. 7, which contains three items, namely "listen to music" for downloading music data from the home-use computer 18a in the user's home to reproduce and output; "play downloadable mini-game" for downloading a communication game program from the home-use computer 18a in the user's home to be executed by the operation device 22; and "check e-mail" for receiving e-mails addressing the user from the server computer 14 to display on the display panel 40. Then, the produced data is sent to the operation device 22, and the screen image is displayed on the display panel 40 thereof.

Figure 8:
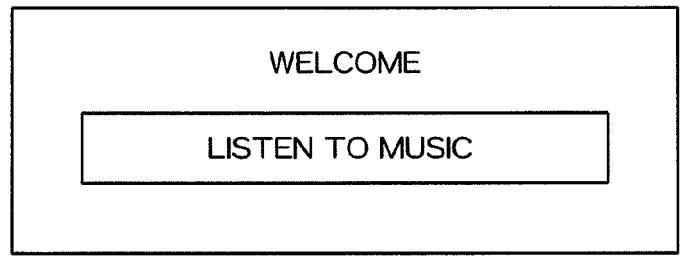
FIG. 8 is a diagram showing the image of a service menu screen provided by the operation device itself without communication with the home-use computer in the user's home, when the user is walking outside their home.
Figure 9:
FIG. 9 is a diagram showing the image of a service menu screen provided by the operation device itself without communication with the home-use computer in the user's home, when the user is not walking outside their home.

When communication cannot be established with either any home-use computer 18a through 18x or any wireless communication base station 20-1 through 20-n, a service menu screen such as is shown in FIG. 8 or 9 is shown depending on the state of the operation device 22. That is, when it is determined that the user is walking or running while carrying the operation device 22, as described above, the operation device 22 produces the data of a service menu screen, as shown in FIG. 8, which contains one menu item, namely, "listen to music" for reproducing music data stored in the operation device 22 itself. Then, the produced screen image is displayed on the display panel 40.

Alternatively, when it is determined that the user is utilizing a movement means, the operation device 22 produces the image of a menu screen, as shown in FIG. 9, which contains two menu items, namely, "listen to music" for reproducing music data stored in the operation device 22 itself, and "play mini-game" for executing a game program stored in the operation device 22 itself.

In this embodiment, it is possible to design the operation device 22 having the acceleration sensor 36 and the gyroscope 38, and to control the home-use computer 18 based on the movement and posture of the operation device 22. In addition, as the states of the operation device 22 and the user thereof can be determined based on the outputs of the acceleration sensor 36 and the gyroscope 38, an appropriate service menu screen can be displayed according to the result of determination. This arrangement can improve user convenience.

In the following, a process to display an image stored in the home-use computer 18 or the memory device connected thereto in a TV receiver will be described as an exemplary operation of the home-use computer 18. The following process is realized by the home-use computer 18 by executing an image viewer program. Specifically, the process is executed by the home-user computer 18 in the user's home when the user selects "look at image" in the service menu shown in FIG. 4, using the operation device 22.

The program may be stored in a computer readable information storage medium such as a CD-ROM, a DVD-ROM, and so forth, for example, and installed therefrom into the home-use computer 18. Alternatively, the program may be downloaded to the home-use computer 18 from other computers via the communication network 12.

In order to use the home-use computer 18 as an image viewer, for example, a lot of image data is stored in advance in a built-in or external hard disk. The image data may be read from various storage media or downloaded from other devices in the communication network 12. The image data may have various contents, including an image captured by the user or other people or created using paint software.

Figure 10:
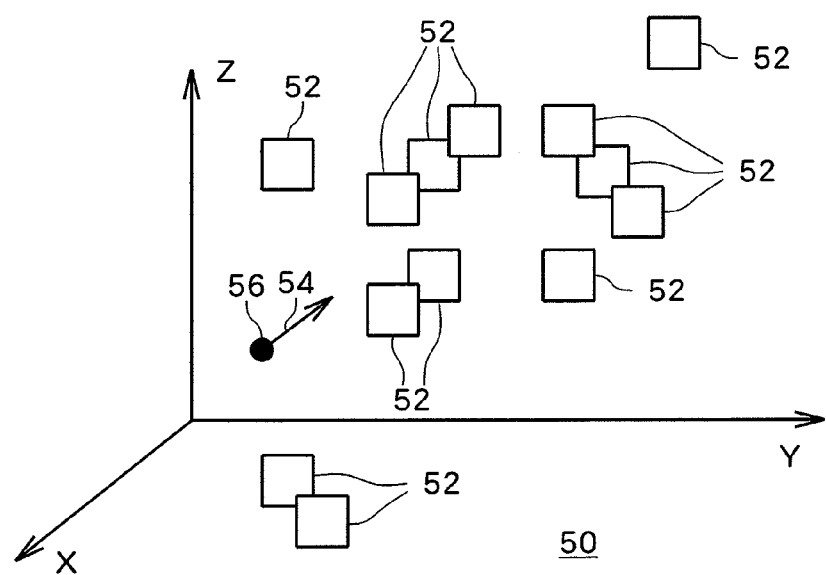
FIG. 10 is a diagram explaining a method for producing the image of a screen to be shown on a monitor such as a TV receiver or the like during execution of an image viewing program.

In this embodiment, data on thumbnail images having smaller data sizes is produced in advance with respect to the lot of image data. In addition, a virtual three-dimensional space is constructed in the memory of the home-use computer 18, in which many image objects having the thumbnail image data mapped thereon as a texture are placed. FIG. 10 shows one example of the virtual space. As shown in FIG. 10, many image objects 52 are placed in the virtual three-dimensional space 50. Each of the image objects 52 is a rectangular object onto which a thumbnail image is mapped as a texture.

The position coordinates of each image object 52 in the virtual three-dimensional space 50 are determined based on the attribute of each image data item. That is, a characteristic vector indicative of the characteristic feature of each image data item is obtained based on the content of the image data (information on a color used or space frequency, result of recognition such as face recognition, and so forth) and auxiliary information of the image data (a time stamp, a file name, content of other document data relevant to the image data), and the position coordinates of the image object 52 relevant to the image data is determined based on the characteristic vector.

With this arrangement, image objects 52 placed closer in the virtual space 50 are given images to be mapped thereon, which have content similar to each other. This arrangement allows the user to find an image object 52 relevant to their desired image, while relying on the positional relationship among the respective image objects 52 in the virtual space 50.

A viewpoint 56 is defined in the virtual three-dimensional space 50, and a viewing direction 54 is defined with respect to the viewpoint 56. The viewpoint 56 is desirably movable within the virtual three-dimensional space 50 according to the operation carried out using the operation device 22. The viewing direction 54 can be defined in a desired direction according to the operation carried out using the operation device 22. The posture of each of the image objects 52 is determined on a real time basis so as to face the viewpoint 56. That is, each of the image objects 52 changes the posture thereof, following the movement of the viewpoint 56.

Specifically, when the operation device 22 is tilted toward the other side of the user, and rotation of the operation device 22 in one direction around the X-axis shown in FIG. 3 is detected based on the output from the acceleration sensor 36, the viewpoint 56 is moved in viewing direction 54. When the operation device 22 is tilted toward the user, and the rotation of the operation device 22 in the opposite direction from that described above around the X-axis shown in FIG. 3 is detected based on the output from the acceleration sensor 36, the viewpoint 56 is moved in the opposite direction from the above in the viewing direction 54.

When the operation device 22 is tilted rightward, and rotation of the operation device 22 in one direction around the Y-axis shown in FIG. 3 is detected based on an output from the acceleration sensor 36, the viewpoint 56 is moved in the rightward direction. When the operation device 22 is tilted leftward, and rotation of the operation device 22 in the opposite direction from that described above around the Y-axis shown in FIG. 3 is detected based on the output from the acceleration sensor 36, the viewpoint 56 is moved in the leftward direction. When movement of the operation device 22 in the Z-direction shown in FIG. 3 is detected based on the output from the acceleration sensor 36, the viewpoint 56 is moved upward. When movement of the operation device 22 in the opposite direction from the Z-direction is detected based on the output from the acceleration sensor 36, the viewpoint 56 is moved downward. Further, the viewing direction 54 is rotated based on the output from the gyroscope 38.

Figure 11A:
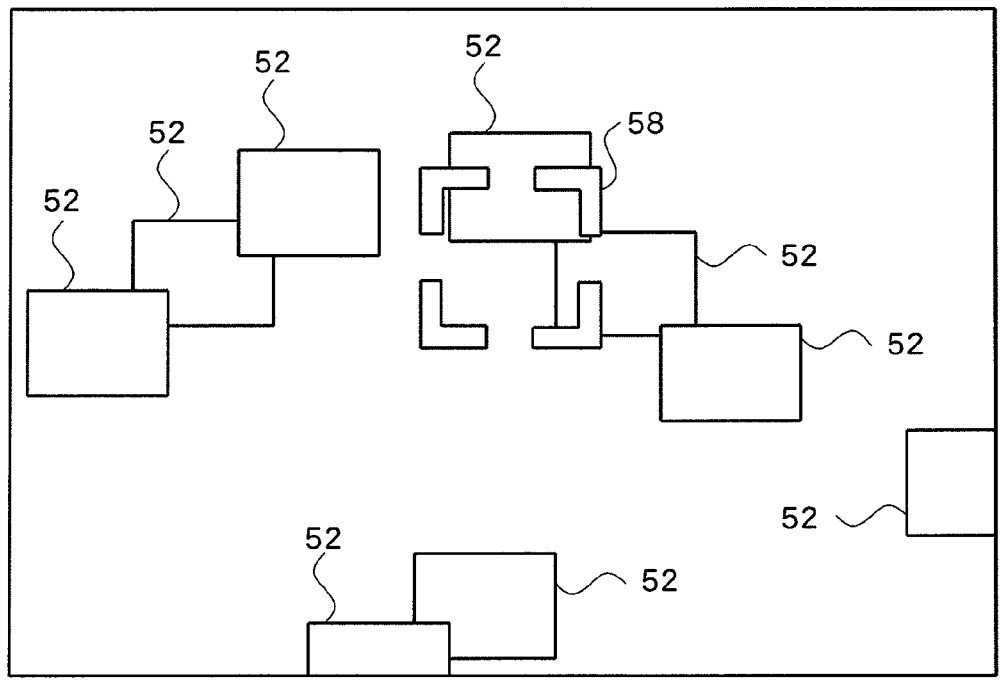
FIG. 11 is a diagram showing an example of a space image shown on a monitor such as a TV receiver or the like during execution of an image viewing program.

The home-use computer 18 produces an image (a space image) of the picture viewed from the viewpoint 56 in the viewing direction 54 on a real time basis (every predetermined period of time), utilizing a known technique for three-dimensional computer graphics, and displays in the TV receiver. FIG. 11(a) shows one example of such a space image. As shown in FIG. 11(a), in the space image, a cursor 58 for designating a partial area (a small quadrangular area) in the space image is shown in addition to the image objects 52. The position of the cursor 58 in the space image (the two-dimensional position) is updated according to input of the direction key 30. That is, upward operation of the direction key 30 leads to upward movement of the cursor 58 in the space image; downward operation of the direction key 30 leads to downward movement of the cursor 58 in the space image; rightward operation of the direction key 30 leads to rightward movement of the cursor 58 in the space image; and left operation of the direction key 30 leads to leftward movement of the cursor 58 in the space image.

Further, pressing the button 32C of the operation device 22 effects selection of the image object 52 displayed in the area then designated by the cursor 58 in the space image. That is, all of the image objects 52 (candidate objects) displayed in the area designated by the cursor 58 in the space image are selected. It should be noted that, in real-time production and display of the space image, it is preferable that the image objects 52 displayed in the area designated by the cursor 58 in the space image are specified, and displayed in advance distinctively from other image objects 52, for example, by being framed or in different colors. This arrangement helps the user know in advance which image objects 52 are to be selected in response to the button 32C pressed. The operation device 22 sequentially stores the identification information of the image objects 52 selected as described above.

It should be noted that some of the image objects 52 displayed in the area designated by the cursor 58 in the space image may be selected based on a predetermined criterion in response to the button 32C pressed. For example, the distance between the viewpoint 56 and each of the image objects 52 which are candidate objects is calculated, so that an image object 52 having a distance smaller than a predetermined value may be selected. Alternatively, a predetermined number of image objects 52 may be selected sequentially beginning with the image object having the smallest distance in ascending order. Still alternatively, some or all of the image objects 52 which are candidate objects may be selected based on the correlation between the attribute (the above-described characteristic vector) of each of the image objects 52 which are candidate objects and a characteristic vector representative of the user's taste. Yet alternatively, some or all of the image objects 52 which are candidate objects may be selected based on the display area of each image object 52 in the area designated by the cursor 58 (a designated area) in the space image. For example, an image object 52 having the largest display area in the designated area may be selected. In this case, it is preferable that an image object 52, among those displayed in the space image designed by the cursor 58, which satisfies a predetermined criterion, may be displayed distinctively from the others.

Figure 11B:
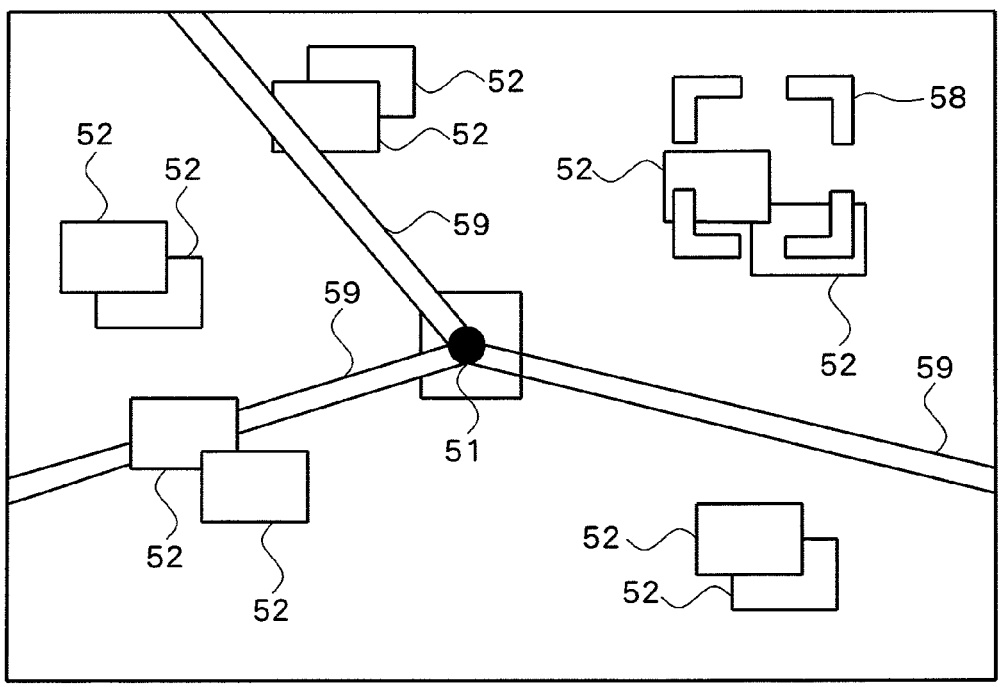

In addition, as shown in FIG. 11(b), a linear object 59 may be defined in the virtual three dimensional space 50 every time an image object 52 is newly selected, which extends between the position of the selected image object 52 in the virtual three-dimensional space 50 and the position 51 ahead of the view point 56 in the forwarding direction (the direction of the viewing direction 54) by a predetermined distance, and the linear object 59 is displayed in the TV receiver. This arrangement is preferable as it helps the user instinctively recognize the direction in which the selected image object 52 is located.

Figure 12:
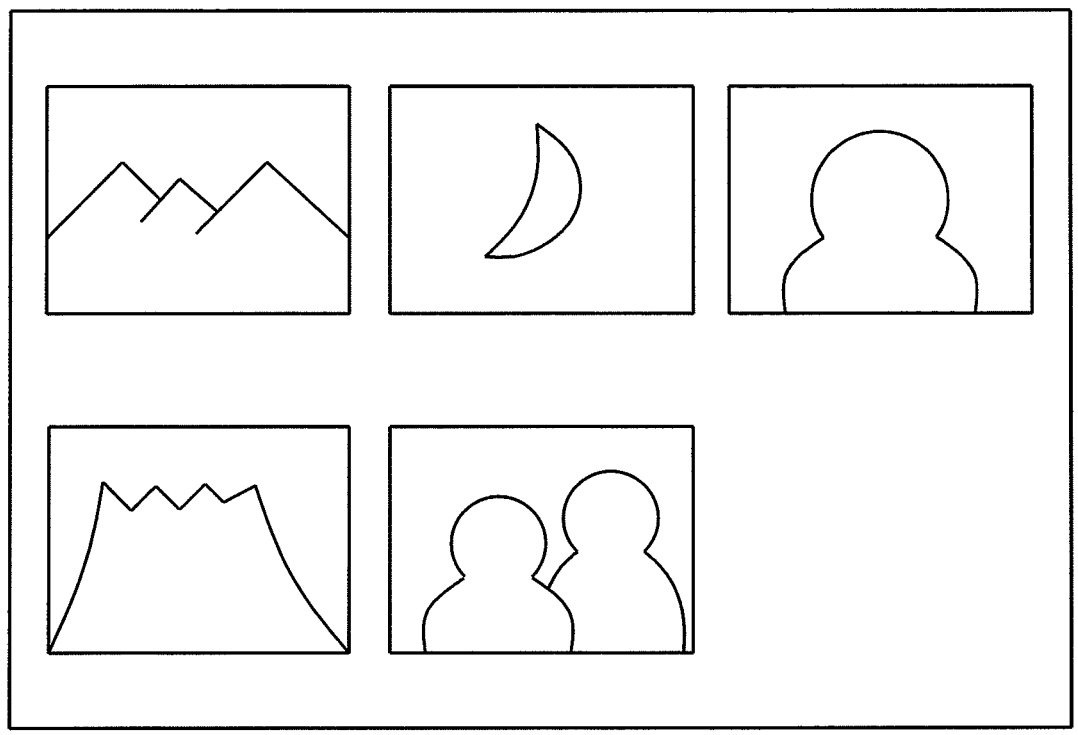
FIG. 12 is a diagram showing an example of an image collective display screen shown on a monitor such as a TV receiver or the like during execution of an image viewing program.

Thereafter, when the auxiliary button 34R of the operation device 22 is pressed, the home-use computer 18 obtains the image data corresponding to the image object 52 selected by the user and identified by the identification information stored, and displays in a list format in the TV receiver. FIG. 12 shows one example of the list display screen.

In this embodiment, tilting, upward and downward movement, and rotation on a horizontal plane of the operation device 22 is reflected in the outputs of the acceleration sensor 36 and the gyroscope 38. Data on the outputs is sent from the operation device 22 to the home-use computer 18, where the viewpoint 56 and the viewing direction 54 are changed based on the data.

Also, when the direction key 30 of the operation device 22 is operated, the operation device 22 sends data describing the content of the operation relative to the direction key 30 to the home-use computer 18, where the position of the cursor 58 in the space image is changed based on the data. Then, in response to the button 32C pressed, some or all of the image objects 52 which are then displayed in the area designated by the cursor 68 are selected. The identification information of the thus selected image objects 52 is sequentially stored in the memory of the home-use computer 18, and later used for collective display in the TV receiver in response to the auxiliary button 34R pressed.

The above-described user interface enables smooth selection of a desired one of the image objects 52 located apart from one another in the virtual three-dimensional space 50, and collective or list display of the relevant image. This arrangement can facilitate operations, such as selection of a print object, collective editing, and so forth, with reference to the list.

It should be noted that although it is arranged in the above description that the image objects 52 are placed in the virtual three dimensional space 50 so that the images can be reviewed in response to the user's operation, the present invention can be similarly applied to selection of service and/or other contents such as a moving image, a game, and so forth, as well as an image. In this application, similar to the case of an image object 52, an object having an image representative of the content or service content mapped thereon as a texture may be placed in the virtual three-dimensional space 50, and after selection of some of the objects, as described above, the selected objects may be collectively processed later for display or the like.

Figure 13:
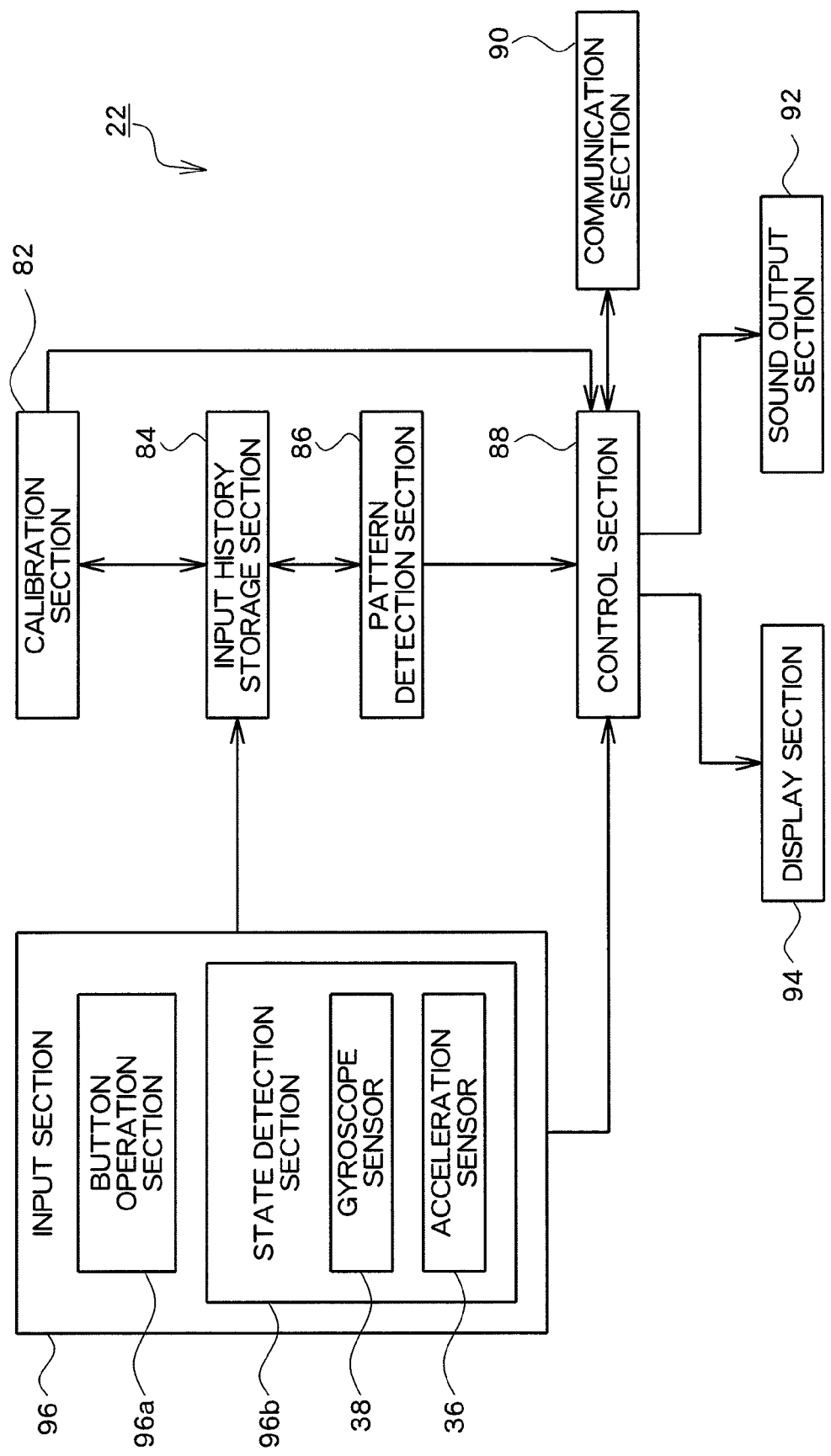
FIG. 13 is a functional block diagram for the operation device.

In the following, a structure of the operation device 22 will be described. FIG. 13 is a diagram showing a functional structure of the operation device 22. As shown in FIG. 13, the operation device 22 comprises, in terms of functions, an input section 96, a calibration section 82, an input history storage section 84, a pattern detection section 86, a control section 88, a communication section 90, a display section 94, and a sound output section 92. These functions are realized by the operation device 22, or a computer, by carrying out a program stored in the ROM of the operation device 22.

The input section 96 comprises a button operation section 96a and a state detection section 96b. The button operation section 96a is used to sequentially detect, every predetermined period of time, whether or not the button group 32, the auxiliary button 34, and the direction key 30 are pressed. The state detection section 96b is used to sequentially determine the state of the operation device 22 every predetermined period of time. In particular, the state detection section 96b comprises a gyroscope 38 for determining the angular velocity of rotation around a predetermined axis of the operation device 22 and an acceleration sensor 36 for determining acceleration of the operation device 22. The state detection section 96b may further have a position measurement means such as a GPS, Polhemus, and so forth, as well as a geomagnetic sensor (a direction sensor).

It should be noted that, obviously, mutual calibration using these plurality of kinds of detection results is applicable. Moreover, a detection result may be calibrated based on other detection results with high reliability. The state detection section 96b may have a sensor for determining the user's state, such as blood pressure, pulsation frequency, fingerprint, heart rate and so forth. The input section 96 continues operating whether the operation device 22 is in the standby mode or the normal operation mode.

The input history storage section 84 sequentially stores the data input via the input section 96, including data identifying whether or not the button group 32, the auxiliary button 34, or the direction key 30 are pressed, and data on the outputs of the gyroscope 38 and the acceleration sensor 36. The input history storage section 84 continues operating whether the operation device 22 is in the standby mode or the normal operation mode.

The calibration section 82 determines the standard posture of the operation device 22 based on the content stored in the input history storage section 84. For example, when it is known from the data stored in the input history storage section 84, that the operation device 22 remains in a certain posture for a predetermined period of time, the calibration section 82 determines that posture as the standard posture. The standard posture determined by the calibration section 82 is supplied to the control section 88.

The pattern detection section 86 monitors whether or not a predetermined pattern appears in the data stored in the input history storage section 84. The pattern detection section 86 continues monitoring in each mode of the standby mode and the normal operation mode. Specifically, in the standby mode, whether or not data concerning a pattern (pattern 1) in which the operation device 22 remains still in a predetermined posture for over a predetermined period of time and is subsequently moved in at least the Z-direction is stored in the input history storage section 84 is monitored. In the normal operation mode, on the other hand, whether or not data concerning a pattern (pattern 2) corresponding to the user's specific behavior (walking, running, or moving using a movement means) is stored, as described above is monitored. In addition, whether or not data concerning a pattern (pattern 3) in which the operation device 22 remains in a predetermined posture for over a predetermined period of time is stored is monitored.

The control section 88 carries out various information processes based on the result of detection by the pattern detection section 86, various input data obtained by the input section 96, and data received by the communication section 90. The display section 94 shows an image on the display panel 40 according to an instruction sent from the control section 88. The sound output section 92 outputs sound via a built-in speaker of the operation device 22 according to an instruction sent from the control section 88.

Specifically, when the operation device 22 is in the standby mode and the pattern detection section 86 detects that data on the pattern 1 is stored in the input history storage section 84, the control section 88 changes the operation mode of the operation device 22 from the standby mode to the normal operation mode, and causes the operation device 22 to begin operating in the normal operation mode. Thereafter, a service menu screen is shown on the display panel 40 based on the communication path between the operation device 22 and the home-use computer 18 and storage of data on which of the user's behavior relevant to the pattern 2 is detected by the operation device 22, and so forth. Then, the control section 88 carries out an appropriate process depending on the user's selection made on the service menu screen, and outputs the result of the processing via the display section 94 and the sound output section 92. In the above, the posture of the operation device 22 is determined based on the data supplied from the input section 96, and displacement between the determined posture and the standard posture determined by the calibration section 83 is calculated. The calculated displacement data is used as the user's operation data.

It should be noted that, instead of determining the standard posture using the calibration section 82, a part or the entirety of the content stored in the input history storage section 84 may be transmitted to the home-use computer 18, together with an instruction requesting to begin operation in the normal operation mode, via the communication section 90, so that the standard posture is determined based on the data received on the home-use computer 18 side (a control section 74 (FIG. 14) to be described later). In this case, the home-use computer 18 calculates a displacement between the posture of the operation device 22, which is sent from the operation device 22, and the determined standard posture, so that the calculated displacement data is used as the user's operation data.

Meanwhile, when the operation device 22 is in the normal operation mode, and the pattern detection section 86 detects that the data on the pattern 3 is stored in the input history storage section 84, the operation device 22 ceases its operation in the normal operation mode and switches to the standby mode.

Figure 14:
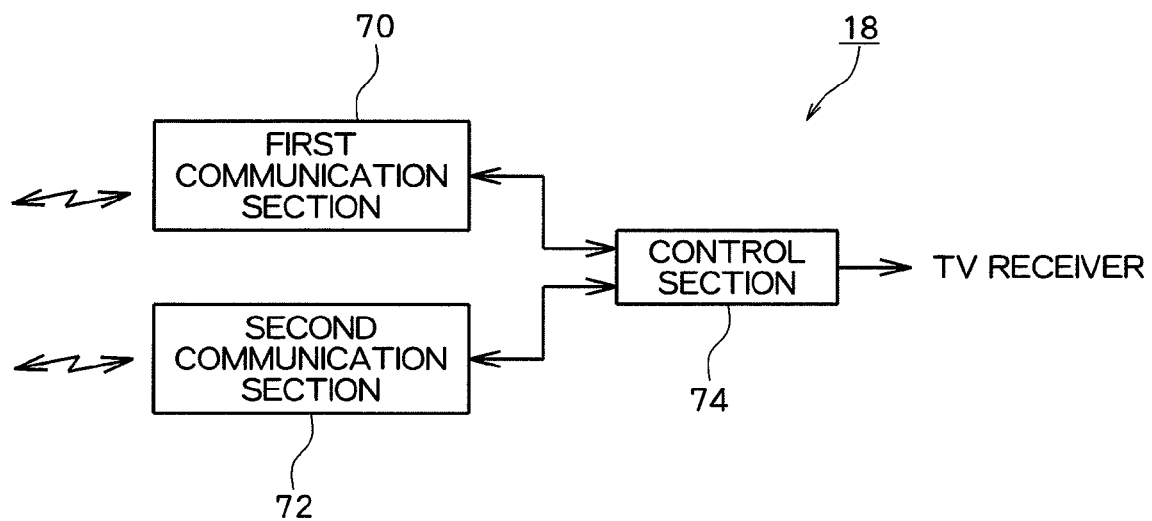
FIG. 14 is a diagram showing a structure of a home-use computer.

In the following, a structure of the home-use computer 18 will be described. The home-use computer 18 is a known computer system as described above, and constructed comprising, as shown in FIG. 14, a first communication section 70, a second communication section 72, and a control section 74. The first communication section 70 is connected to the communication network 12, and carries out data communication with other home-use computers 18 and the wireless communication base stations 20-1 through 20-n or the server computer 14 via the communication network 12.

The second communication section 72 is a short distance wireless communication means such as BlueTooth, or the like, and carries out direct wireless data communication with the communication section 90 of the operation device 22.

The control section 74 is a computer for carrying out a program read from a computer readable information storage medium, such as a CD-ROM, a DVD-ROM, and so forth, or downloaded via the communication network 12. The control section 74 carries out the program based on the data describing the content of the user's operation, which is received using the second communication section 72 from the operation device 22. The control section 74 also carries out communication, as required, using the first communication section 71 with other devices in the communication network 12, and outputs the result of processing to the TV receiver.

Here, a process to be carried out by the operation device 22 when beginning an operation in the normal operation mode will be described.

Figure 15:
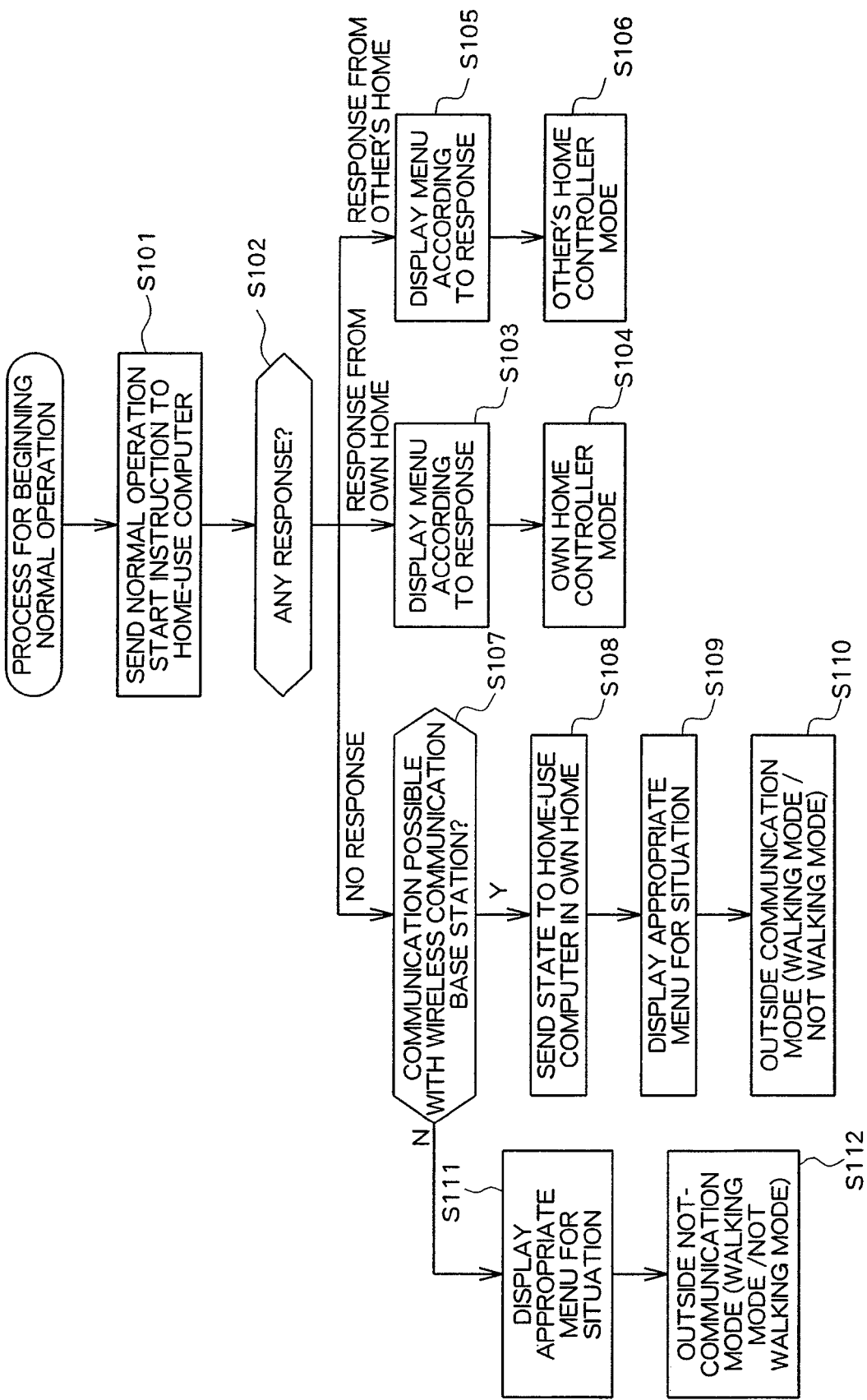
FIG. 15 is a flowchart of a process carried out by the operation device when beginning a normal operation.

FIG. 15 is a flowchart of a process to be carried out when the operation device 22 begins operating in the normal operation mode. Specifically, the process shown in FIG. 15 is carried out when the user operates the power button 42 of the operation device 22 to thereby explicitly switch the operation mode of the operation device 22 from the standby mode to the normal operation mode. The process is also carried out when the pattern detection section 86 finds data on the pattern 1 among those stored in the input history storage section 84.

As shown in FIG. 15, in this process, a signal is sent to the home-use computer 18, instructing to begin operation in the normal operation mode (S101). This signal contains the ID of the operation device 22.

Then, when the home-use computer 18 in the user's home, that is, the home-use computer 18 assigned with, or storing, the ID corresponding to the ID contained in the signal, receives the signal using the second communication section 72, while remaining in the standby mode, the home-use computer 18 switches the operation mode from the standby mode to the normal operation mode. Then, the home-use computer 18 sends the image of the service menu screen shown in FIG. 9 to the operation device 22. Having received the data of the service menu screen, the operation device 22 displays the received data on the display panel 40 (S103). Thereafter, the operation device 22 begins operating as an operation means of the home-use computer 18 in the user's home (S104). That is, data describing the contents of various operations carried out relative to the operation device 22 is corrected based on the standard posture determined by the calibration section 82, and then sent to the home-use computer 18.

Meanwhile, when the home-use computer 18 in the user's friend's home, that is, the home-use computer 18 which is not assigned with, or storing, the ID corresponding to the ID contained in the signal sent from the operation device 22, receives the signal using the second communication section 72, while remaining in the standby mode, the home-use computer 18 switches the operation mode from the standby operation mode to the normal operation mode. Thereafter, the home-use computer 18 in the friend's home accesses the home-use computer 18 in the user's home, or the home-use computer 18 identified by the ID contained in the signal, using the first communication section 70, obtains therefrom the image of the service menu screen shown in FIG. 5, and sends this image to the operation device 22. Having received the data of the service menu screen, the operation device 22 displays the received data on the display panel 40 (S105). Thereafter, the operation device 22 begins operating as an operation means of the home-use computer 18 in the user's friend's home (S106). That is, data describing the contents of various operations carried out relative to the operation device 22 is corrected based on the standard posture determined by the calibration section 82, and then sent to the home-use computer 18 in the user's friend's home.

Further, when no response is returned from any home-use computer 18, the operation device 22 determines whether or not communication is possible with any wireless communication base station 20-1 through 20-n (S107). When it is determined that such communication is possible, the operation device 22 accesses the home-use computer 18 in the user's home via the wireless communication base station 20, and sends to the home-use computer 18 data concerning the result of detection by the pattern detection section 86, that is, data identifying the behavior (walking or running, or utilizing a movement means) which the user is engaged in (behavior type data) (S108). Then, the operation device 22 receives the data of a service menu screen (FIG. 6 or 7) depending on the behavior type data, sent from the home-use computer 18 in the user's home, and displays the screen image on the display panel 40 (S109). Thereafter, the operation of the operation device 22 is controlled based on the service menu screen displayed on the display panel 40 (S110).

Meanwhile, when it is determined that communication is not possible with any of the wireless communication base stations 20-1 through 20-n, the operation device 22 produces the image of the service menu screen shown in FIG. 8 or 9 based on the result of detection by the pattern detection section 86, that is, the behavior type data identifying the behavior which the user is engaged in, and displays on the display panel 40 (S111). Thereafter, the operation of the operation device 22 is controlled based on the service menu screen displayed on the display panel 40 (S112).

Finally, a structure of the control section 74 of the home-use computer 18, relevant to the case in which the control section 74 functions as the above-described image viewer will be described.

Figure 16:
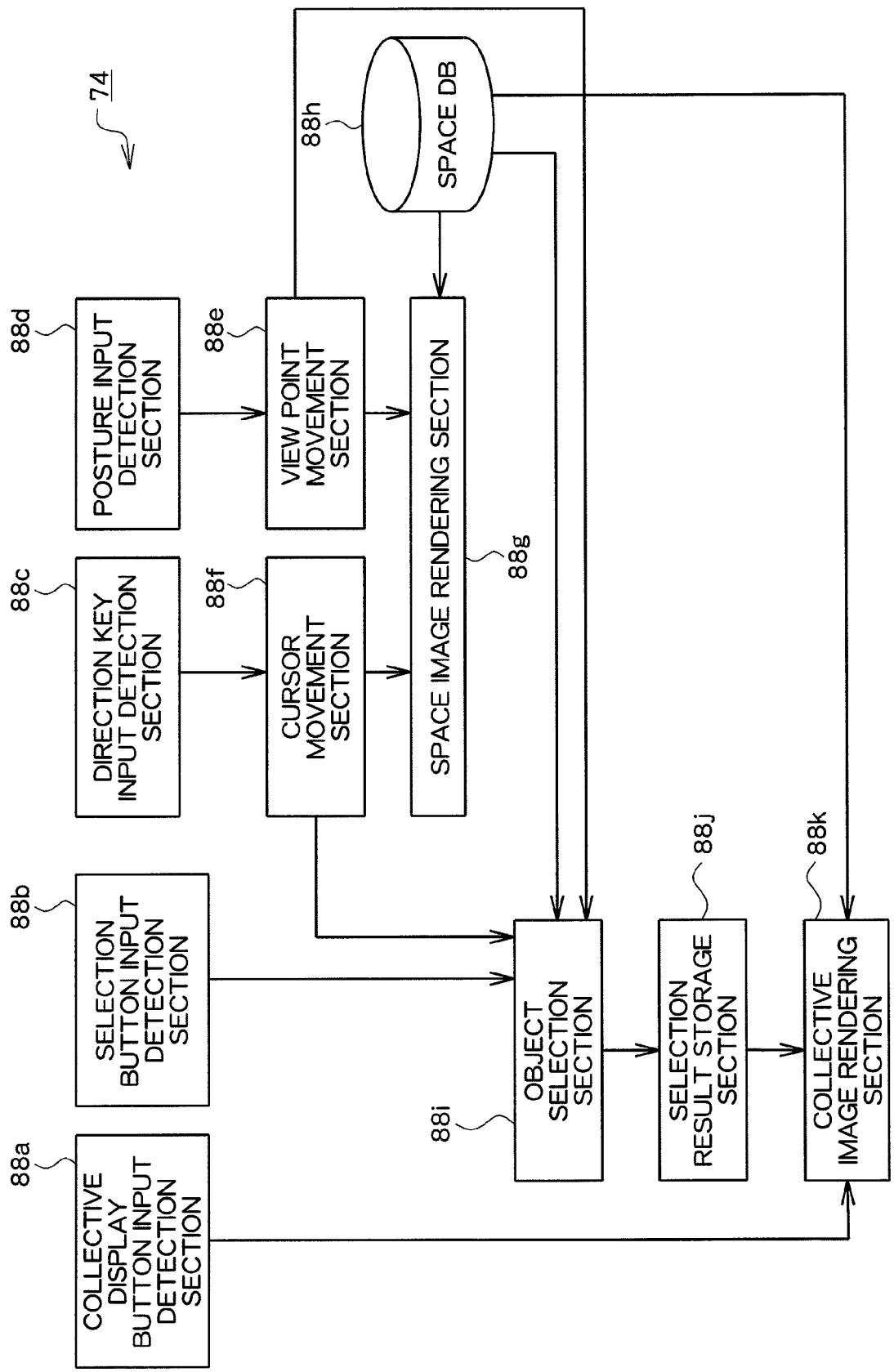
FIG. 16 is a functional block diagram for the home-use computer during execution of an image viewing program.

FIG. 16 shows a relationship among the functions realized by the control section 74 by executing an image viewer program. As shown in FIG. 16, in this case, the control section 74 comprises a collective display button input detection section 88a, a selection button input detection section 88b, a direction key input detection section 88c, a posture input detection section 88d, a viewpoint movement section 88e, a cursor movement section 88f, a space image rendering section 88g, a space database 88h, an object selection section 88i, a selection result storage section 88j, and a collective image rendering section 88k.

Initially, the direction key input detection section 88c determines the content of an operation relative to the direction key 80 every predetermined period of time, and notifies the cursor movement section 88f of the content. The cursor movement section 88f updates the position of the cursor 58 in the space image every predetermined period of time based on the notified content of operation carried out relative to the direction key 80.

The posture input detection section 88d obtains outputs of the acceleration sensor 36 and the gyroscope 38, and notifies the viewpoint movement section 88e of the content of the outputs. In return, the viewpoint movement section 88e updates the position of the viewpoint 56 and the viewing direction 54 for every predetermined period of time based on the outputs of the acceleration sensor 36 and the gyroscope 38.

The space database 88h stores the positions of the image objects 52 in the virtual three-dimensional space 50. The space image rendering section 88g produces an image of the picture viewed from the viewpoint 56 in the viewing direction 54 in the virtual three-dimensional space 50 based on the positions stored in the space database 88h, the updated position of the viewpoint 56 by the view point movement section 88e, and the viewing direction 54. The image of the cursor 58 is superimposed in the position updated by the cursor movement section 88f in the produced image. The resultant space image is rendered into the display memory. The image in the display memory is read for every predetermined period of time, and displayed in the TV receiver.

Thereafter, the selection button input detection section 88b detects, every predetermined period of time, whether or not the button 32C serving as a selection button is pressed. Upon detection of the button 32C being pressed, the selection button input detection section 88b notifies the object selection section 88i of the fact. In return, the object selection section 88i selects some or all of the image objects 52 displayed in the area (designated area) designated by the cursor 58, based on the positions of the cursor 58 and the viewpoint 56 and the viewing direction 54 at the time when the button 32C is pressed. Then, identification information of the selected image object 52 is stored in the selection result storage section 88j.

The collective display button input detection section 88a detects, every predetermined period of time, whether or not the auxiliary button 34R serving as a collective display button is pressed. Upon detection of the auxiliary button 34R being pressed, the collective display button input detection section 88a notifies the collective image rendering section 88k of the fact. Accordingly, when the auxiliary button 84R is pressed, the collective image rendering section 88k reads identification information from the selection result storage section 88j and image data on the image object 52 identified by the identification information from the space database 88h. Then, the collective image rendering section 88k renders an image into the display memory, which contains respective image data items arranged in a predetermined interval in a list format. The image stored in the display memory is read every predetermined period of time, as described above, and displayed in the TV receiver. This arrangement allows the TV receiver to smoothly display the list screen when the auxiliary button 84R is pressed.

In the above-described embodiment, it is possible to designate a part of the space image using the direction key 30 to select a desired image object 52, while moving in the vertical three-dimensional space 50 according to the posture and movement of the operation device 22. This enables accurate selection of the image objects 52 placed apart from each other in the virtual three-dimensional space 50.

Also, the acceleration sensor 36 detects accelerations of the operation device 22 in a plurality of directions, so that the home-use computer 18 switches the operation mode thereof from the standby mode to the normal operation mode, or vice versa, based on the detected acceleration pattern. This arrangement makes it possible for the operation device 22 to smoothly begin, or stop, a necessary operation, without requiring the user to operate a specific button, such as a power button, or the like.

Also, the content of a service menu screen which the home-use computer 18 transmits to the operation device 22 is changed according to the pattern detected by the state detection section 96b of the operation device 22. This arrangement allows the user to utilize a service menu screen appropriate to their current situation. It should be noted that when it is arranged such that the state detection section 96b determines the state of the user, as described above, it is preferable that relevant information, such as a physical examination result, may be additionally presented on a service menu screen, or sent to the operation device 22 to be included in a difference service menu. When the state detection section 96b has a position measurement means, the home-use computer 18 can know the user's location. In this case, it is preferable that the home-use computer 18 sends appropriate information to the operation device 22 depending on the user's location.

What is claimed is:

1. A user interface device, comprising:
   virtual space image display means for producing an image of a virtual space where a plurality of objects are placed, on a real time basis according to a position of a viewpoint defined in the virtual space, and sequentially displaying the image;
   viewpoint position change means for changing the position of the viewpoint defined in the virtual space according to a first operation by the user;
   object selection means for specifying an area in the image using a cursor having a pre-defined area for selecting an object that is at least partially included in the specified pre-defined area according to a second operation by the user;
   storage means for storing identification information on the object selected by the object selection means; and
   process execution means for executing a predetermined process in connection with the selected object, wherein said object is selected if it is located within the specified pre-defined area and less than or equal to a predetermined distance away from a viewpoint.

2. The user interface device according to claim 1, wherein, the object selection means selects the object displayed in the specified pre-defined area according to a distance between a position of the object displayed in the specified area and the position of the viewpoint.

3. The user interface device according to claim 1, wherein, the object selection means selects the selected object displayed in the specified pre-defined area according to an attribute of the selected object displayed in the specified pre-defined area.

4. The user interface device according to claim 1, wherein, the object selection means selects the selected object displayed in the specified pre-defined area when an area occupied by the selected object is greater than a predetermined area of the pre-defined area.

5. The user interface device according to claim 1, wherein the viewpoint position change means changes the position of the viewpoint defined in the virtual space according to a posture of the operation device, which is changed according to the first operation by the user,
wherein the posture of the operation device is determined using the output of a gyroscope or an acceleration sensor.

6. The user interface device according to claim 1, wherein the process execution means carries out a process to collectively display images concerning the selected object.

7. The user interface device according to claim 1, wherein each of said objects are automatically arranged in said virtual space according to an attribute of each of said objects.

8. The user interface device according to claim 7, wherein said object attribute is spatial frequency.

9. The user interface device according to claim 7, wherein said object attribute is a face.

10. The user interface device according to claim 7, wherein said object attribute is color.

11. The user interface device according to claim 7, wherein said object attribute is a time stamp or a file name.

12. The user interface device according to claim 1, wherein:
said virtual space image display means, viewpoint position change means, object selection means, storage means and process execution means are comprised within a computer.

13. The user interface device according to claim 1, wherein a portable computing device controls the object selecting means.

14. A user interface method, comprising:
a virtual space image display step of producing an image of a virtual space where a plurality of objects are placed, on a real time basis according to a position of a viewpoint defined in the virtual space, and sequentially displaying the image;
a viewpoint position change step of changing the position of the viewpoint defined in the virtual space according to a first operation by the user;
an object selection step of selecting objects using a cursor having a pre-defined area, wherein the objects are at least partially included in the specified pre-defined area, according to a second operation by the user;
a storage step of storing identification information on the objects selected by the object selection means; and
a process execution step of executing a predetermined process in connection with the selected objects, wherein said objects are selected in descending order, starting by selecting an object having a smallest distance between said object and a viewpoint and ending by selecting an object with a largest distance between said object and a viewpoint, or
wherein all of said objects located with the specified pre-defined area are selected according to a pre-defined criteria.

15. An information storage medium storing a program for causing a computer to function as:
virtual space image display means for producing an image of a virtual space where a plurality of objects are placed, on a real time basis according to a position of a viewpoint defined in the virtual space, and sequentially displaying the image;
viewpoint position change means for changing the position of the viewpoint defined in the virtual space according to a first operation by the user;
object selection means for specifying an area in the image using a cursor having a pre-defined area for selecting objects that are at least partially included in the specified pre-defined area according to a second operation by the user;
storage means for storing identification information on the objects selected by the object selections means; and
process execution means for executing a predetermined process in connection with the selected objects, wherein said objects located with the specified pre-defined area are selected in a descending order based on a correlation between an attribute of the object and a characteristic vector representative of a user's preferences, or
wherein said objects located within the specified pre-defined area are selected in an order of largest to smallest with respect to a display size of the object in the pre-defined area.

* * * * *